United States Patent [19]
Kasahara et al.

[11] Patent Number: 6,142,635
[45] Date of Patent: Nov. 7, 2000

[54] IMAGE PROJECTION SYSTEM FOR DOME SURFACE

[75] Inventors: Makoto Kasahara, Yamanashi; Hiromitsu Ota, Fuchu; Mitsugu Omori; Hiroaki In, both of Yamanashi; Hidehiko Miyazaki, Fuchu, all of Japan

[73] Assignee: Kabushikigaisya Goto Kogaku Kenkyujyo, Tokyo, Japan

[21] Appl. No.: 09/357,543

[22] Filed: Jul. 20, 1999

[30] Foreign Application Priority Data

Jul. 23, 1998 [JP] Japan .................................. 10-222479

[51] Int. Cl.[7] ................................................. G03B 21/14
[52] U.S. Cl. ............................................. 353/69; 353/122
[58] Field of Search ................... 353/69, 62, 98, 353/122; 352/69, 70; 434/284

[56] References Cited

U.S. PATENT DOCUMENTS

| | | | |
|---|---|---|---|
| 3,695,751 | 10/1972 | Watanuki | 352/70 |
| 3,904,289 | 9/1975 | Yager | 353/122 |
| 3,998,532 | 12/1976 | Dykes | 352/69 |
| 4,597,633 | 7/1986 | Fussell | 352/69 |
| 4,656,506 | 4/1987 | Ritchey | 353/82 |
| 5,762,413 | 6/1998 | Culucci et al. | 353/122 |

*Primary Examiner*—William Dowling
*Attorney, Agent, or Firm*—Lackenbach Siegel

[57] ABSTRACT

An image to be projected is deformed to obtain a projected image having small distortion. An image deforming device constituted by an optical fiber bundle is arranged in front of an original of a projector arranged at a position other than the center of a dome, so that the image of the original is transmitted from an end face on the incident side of an image correction device to an end face on the emission side as images divided into pixels using optical fibers as units. A secondary image subjected to predetermined deformation is displayed on the end face on the emission side, and the secondary image is projected on a dome surface to obtain a projected image which is free from distortion by the same manner as that performed when the original is projected from the center of the dome onto the same projection surface.

9 Claims, 7 Drawing Sheets

IMAGE PROJECTION SYSTEM FOR DOME SURFACE

BACKGROUND OF THE INVENTION

1. Field of the Invention

The present invention relates to a system for projecting an image on a projection surface in a dome (to be referred to as a dome surface hereinafter).

In this specification, three terms, i.e., an "original", an "image", and a "projected image" are used. These terms are defined as follows.

1. Original . . . indicates a medium on which an image is displayed. As typical originals, optical original plates such as projection films and reversal films are known. For example, the original plates also include an active image display device such as a CRT or an LCD. In this invention, the latter rather than the former is supposed as a main original.
2. Image . . . indicates an image displayed on an original. The image is displayed on an optical original plate such as a projection film or a reversal film. In an active image display device, an image is displayed on an image surface (projection surface). Generally, an "original" and an "image" need not be discriminated from each other. However, this invention has a characteristic feature that an original itself is not deformed, but an image displayed by the original is displayed to obtain a secondary image. For this reason, both the original and the image are not discriminated from each other.
3. Projected image . . . indicates an image projected on a projection surface when an image is projected by a projection optical system.

2. Description of Related Art

A facility in which an image is projected on a spherical dome surface in place of a flat screen is well known as a global full-arc movie theater.

If an angle of view obtained when a video image is photographed is equal to an angle of projected view of a projector, as far as an audience watch a video image from the same point as that of a projection position, the same correct video image as that obtained in photographing is reproduced for the audience. However, the projection position cannot be theoretically made equal to the audience position. In addition, identical lenses are not used as a photographing lens and a projection, and the angles of projection view of both the lenses are not equal to each other. For this reason, in such a case, if a video image is observed from a projection position or a photographing position, a correct video image is not reproduced.

The above conditions are also satisfied on a dome surface. In this case, when the installation position of a projector is set at the center of the dome, a video image the smallest distortion can be watched by all the audience. However, in fact, the projector can be installed at such a position due to the arrangement of audience seats or the installation environment of the projection. As a result, the projector is actually installed at a position being out of the center of the dome.

When the projector is installed at the position being out of the center of the dome, the actual shape of an object is not similar to the projected image, and the projected video image is distorted. For this reason, an angle of projected image is made narrow to project a video image whose distortion is not conspicuous, or a large video image is directly projected without regarding distortion itself. However, the feeling of being at a live performance which the video image originally has cannot be reproduced because of a narrow angle of view in the former and because of distortion in the latter.

In addition, it is supposed that one video image is divided by a plurality of projectors to be projected on a dome surface. In this case, installation of the projectors at ideal positions means concentric installation of the projectors at the center of the dome, and realization of the installation is not real.

In order solve the problem described above, the present applicant invented a projection method in which, when an image is projected from at a position other than the center of a dome onto a predetermined projection surface, a projected image having small distortion obtained when the same image is projected from the center of the dome onto the same projection surface is supposed, the image to be projected is deformed such that the projected image projected by a projector installed at a position other than the center of the dome, and distortion of the projected image projected on the dome surface is removed as a result. This method was disclosed in Japanese Patent Application Laid-Open Nos. 8-88822 and 9-149351. The present invention relates to a means for deforming an image to performing the invention described above.

In order to obtain a projected image having small distortion, with respect to means for deforming an image to be projected, the following two means are disclosed in the known references described above.

1. The waveforms of horizontal and vertical scanning voltages of a video projector are adjusted, so that an image to be projected is deformed (Japanese Patent Application Laid-Open No. 9-149351).
2. The positions of pixels of a video projector are adjusted, so that an image to be projected is deformed (Japanese Patent Application Laid-Open No. 8-88822).

However, the means corresponding to the former must superpose waveforms given by a complex function for a vertical/horizontal polarizing circuit. In addition, the means can be applied to only a projector such as a CRT having a form in which scanning is performed by an electronic beam. The means could not be applied to a solid-state display device such as an LCD which have been mainly used in recent years.

On the other hand, the means corresponding to the latter can be applied to a solid-state display device such as an LCD. However, a dedicated device in which the pixel arrangement/pixel size of the display device itself is change must be manufactured, or a large-scale circuit for performing rearrangement of pixels for deformation must be added.

In addition, as a matter of course, any one of the means can be applied to only a projector such as a projector, i.e., an LCD or a CRT in which an image is displayed on a video image surface by an electric signal to project the image on a projection surface through an optical system.

SUMMARY OF THE INVENTION

The present invention uses has as its object to obtain a means for deforming an image which is easily performed by an approach different from that of the prior art described above without depending on the type of a projector. The present invention is characterized by comprising the following configuration.

More specifically, a projection system according to the present invention, includes a projector, arranged at a position other than the center of a dome, for projecting an image on a projection surface in the dome, and an image deforming device arranged in front of an original of the projector and consisting of an optical fiber bundle for transmitting an image of the original from an end face on an incident side to an end face on an emission side as images divided into pixels using optical fibers as units to display the images on the end face on the emission side as a secondary image which is deformed, characterized in that, when the secondary image is projected on the projection surface in the dome, distortion of the projected image is removed such that the projected image coincides with a projected image obtained when an original is projected from the center of the dome onto the same projection surface.

DETAILED DESCRIPTION OF THE PREFERRED EMBODIMENTS

Figure 1:
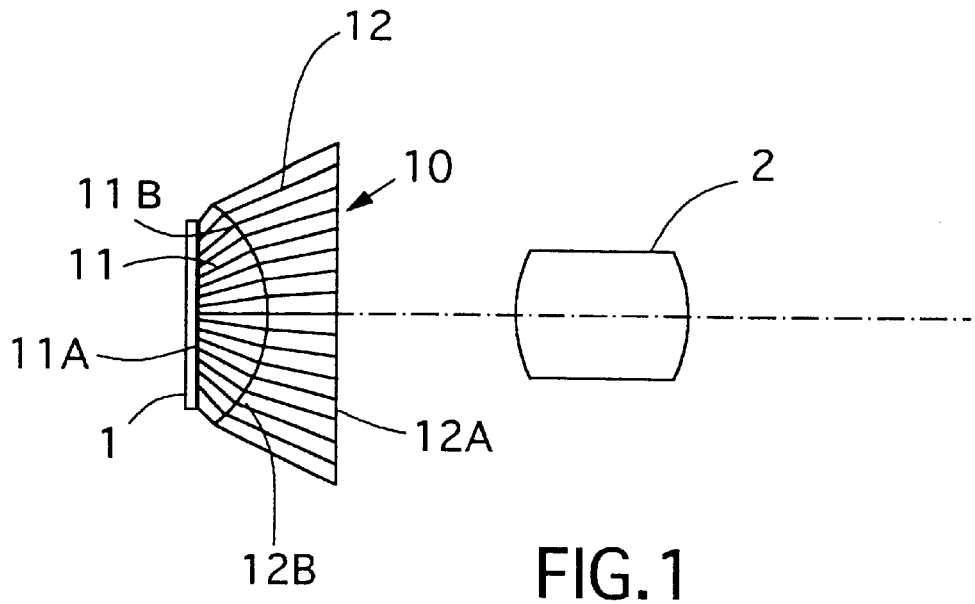
FIG. 1 is a sectional view showing the configuration of an optical system according to the first embodiment of the present invention.

In this invention, an image is not deformed by an electric means in the step of forming the image, the image is deformed by an optical device arranged in front of an original which has been formed.

It is well known in Japanese Patent Application Laid-Open No. 3-88586 or the like that a projected image is subjected to any deformation by a lens of a video projector for projecting a CRT image in the optical device. A skilled person can easily think that a projected image is corrected by using a lens when the known invention made by the present applicant is performed. However, when an image is projected from an arbitrary position onto a predetermined projection surface, a projected image obtained when the same image is projected from an ideal position onto the same projection surface is supposed, and a lens for correcting an image to be projected is designed such that the projected image coincides with a projected image projected from an arbitrary position by a projector. The design of the lens is considerably complex more than that of a simple equidistant projective lens disclosed in Japanese Patent Application Laid-Open No. 3-88586. In addition, the image quality of a projected image obtained by the lens is not known and is not practically used. The reason for this fact is as follows.

1. In general, spherical and aspheric lens surfaces constituting a lens system are rotationally symmetrical about an optical axis. However, when a lens system which achieves the above object is supposed, the lens surfaces are asymmetrical about the optical axis. It is very difficult to design and manufacture the lens system, and realization of the lens system is not practical at present.

2. Abbreviation is consciously given to a projection lens to correct an image to be projected. For this reason, an amount of correction is equal to or larger than a predetermined amount of correction, it may be impossible to manufacture the lens system.

The present inventors groped about the fact in consideration of the above circumstances. As a result, the present inventors thought that an image was deformed by an electric means or an optical fiber bundle serving as a means which did not use a projection lens.

Here, the "optical fiber bundle" is a known optical device consisting of a set of many optical fibers each having a small diameter, and is called an image guide, an image fiber, and a fiber optic plate. The optical fiber bundle has a structure in which a set of fibers each having a small diameter and each obtained by coating core glass (core portion) having a high refractive index with coating glass (cladding portion) having a low refractive index are fused to each other. Total reflection of incident light is repeated to efficiently transmit the light at a high resolution from an incident surface to an emission surface. In the entire optical fiber bundle, an image being incident is divided into pixels whose number is equal to the number of fibers, and the images are transmitted to be displayed on an end face of the emission side. The end face itself may be regarded as a set of countless emitters. As the optical fiber bundle, a straight optical fiber bundle (face plate) in which optical fibers parallel extend from one end face to the other end face while the arrangement of the optical fibers is kept and a tapered optical fiber bundle in which fibers are radially diffused or converged to extend from one end face to the other end face are known. The former is used to transmit an image without changing the size and direction of the image, and the latter is used to transmit an image while the image is enlarged or reduced in size.

The structure of an optical fiber bundle and the known method of using the optical fiber bundle are as described above. In contrast to this, the present inventors thought that each of the fibers constituting the optical fiber bundle could be regarded as collimated beams in the straight optical fiber bundle and can be regarded as beams dispersed from an (imaginary) point light source in the tapered optical fiber bundle. By using this nature, the degree of tapering or the shape of a coupling end face of a pair of optical fiber bundles was set, so that the inventors invented a means for deforming an image transmitted from the end face on the incident side to the end face on the emission side as images divided into pixels using the optical fibers as units.

Figure 3:
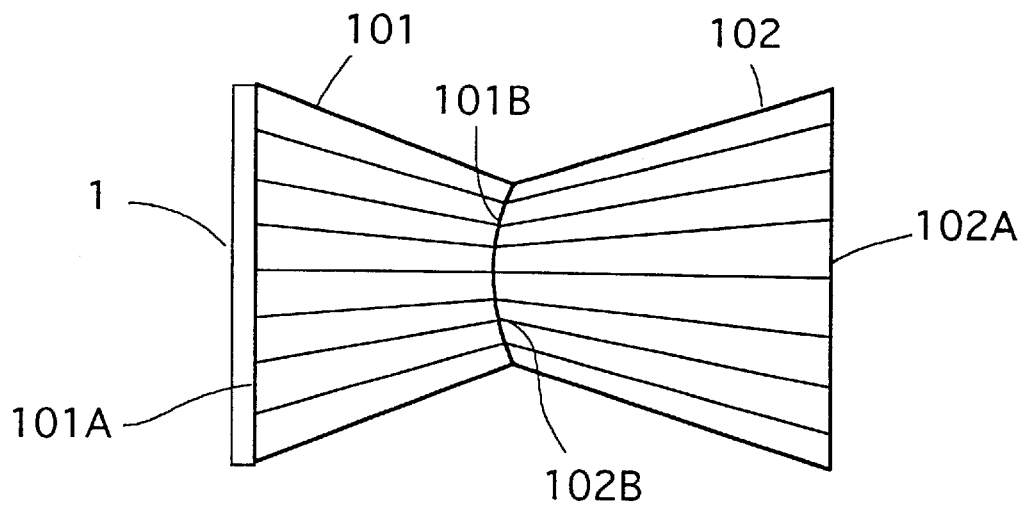
FIG. 3 is a sectional view showing the image deforming device for explaining the operation of the present invention.
Figure 4:
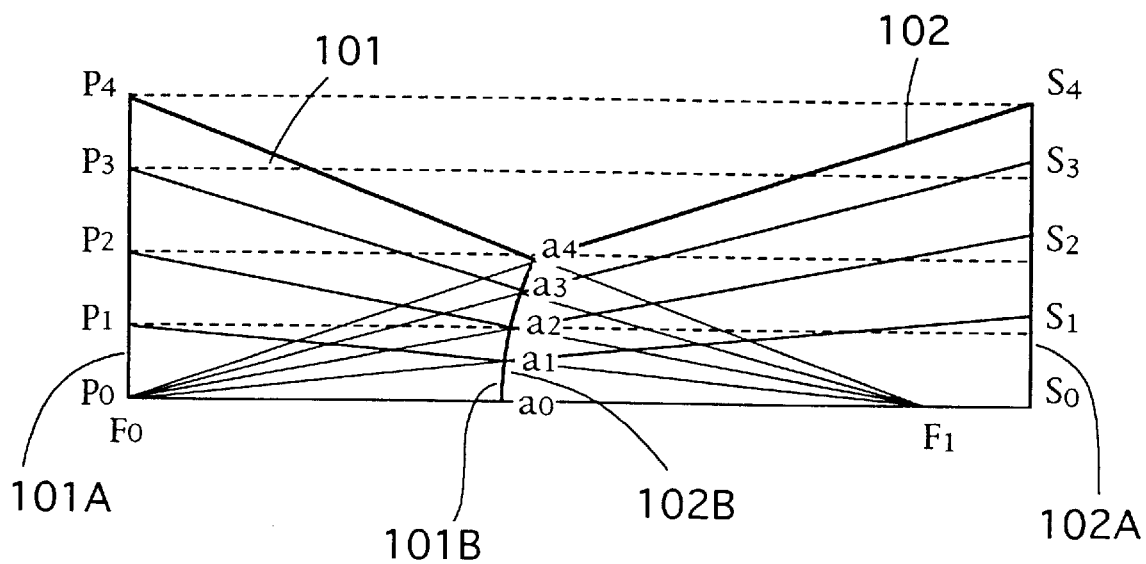
FIG. 4 is a chart of the principle of the image deforming device.

In order to easily understand the principle of the deforming means, it is proved by FIGS. 3 and 4 that an image is deformed. FIG. 3 is a sectional view showing the configuration of an image deforming device having a structure in which a pair of tapered optical fiber bundles 101 and 102 are coupled to each other, and FIG. 4 is a chart showing the principle of the image deforming device in FIG. 3. In the image deforming device, one end serving as an end face 101A on the incident side of the optical fiber bundle 101 is ground to be flat, and the other end serving as an end face 101B on the coupling side is ground to be a concave spherical surface. One end serving as an end face 102A on the emission side of the optical fiber bundle 102 is ground to be flat, and the other end serving as an end face 102B on the coupling side is ground to be a convex spherical surface which coincides with the end face 101B on the coupling side of the optical fiber bundle 101.

When the image deforming device is arranged in front of an original 1 to be in tight contact with or to be close to the front surface of the original 1, the image of the original is transmitted from the end face 101A on the incident side of the optical fiber bundle 101 to the end face 101B on the coupling side as images divided into pixels using optical fibers as units. In addition, the images are transmitted from the end face 102B on the coupling side of the optical fiber bundle 102 to the end face 102A on the emission side to be displayed on the end face 102A on the emission side. In this case, if imaginary convergent points of the optical fiber bundles 102 and 101 are represented by $F_0$ and $F_1$, respectively, in FIG. 4, pixels $P_0$ to $P_4$ of the image on the end face 101A on the incident side of the optical fiber bundle 101 are displayed as pixels $S_0$ to $S_4$ on the end face 102A on the emission side of the optical fiber bundle 102 through pixels $a_0$ to $a_4$ on the coupling surface of the optical fiber bundles 102 and 101. At this time, although the heights of the pixels $P_0$ and $S_0$ are equal to the heights of the pixels $P_4$ and $S_4$, the heights of the pixels $P_1$ to $P_3$ and the heights of the pixels $S_1$ to $S_3$ are different from each other, and it is understood that the image of the original is deformed to be displayed on the end face 102A on the emission side.

In this invention, an image is not deformed by an electric means, and an image is deformed by an optical fiber bundle arranged in front of the original. For this reason, the types of originals are not limited. The present invention can be applied to even an original displayed on an active image display device such as an LCD or a CRT in which an image is displayed on an video image surface by an electric signal, or an original displayed on an optical original plate such as a projection film. In this case, different incident means are used for an image deforming device depending on the types of originals. The incident means will be described in the embodiments.

EMBODIMENTS

When an image is projected on a dome surface by a projector installed at an arbitrary position in a dome, an projected image obtained when the same image is projected from the center of the dome is supposed. The first embodiment to the sixth embodiment which assume a projection method for deforming an image to be projected such that the supposed projected image coincides with a projected image projected by the projector installed at the arbitrary position will be disclosed.

First Embodiment

Figure 2:
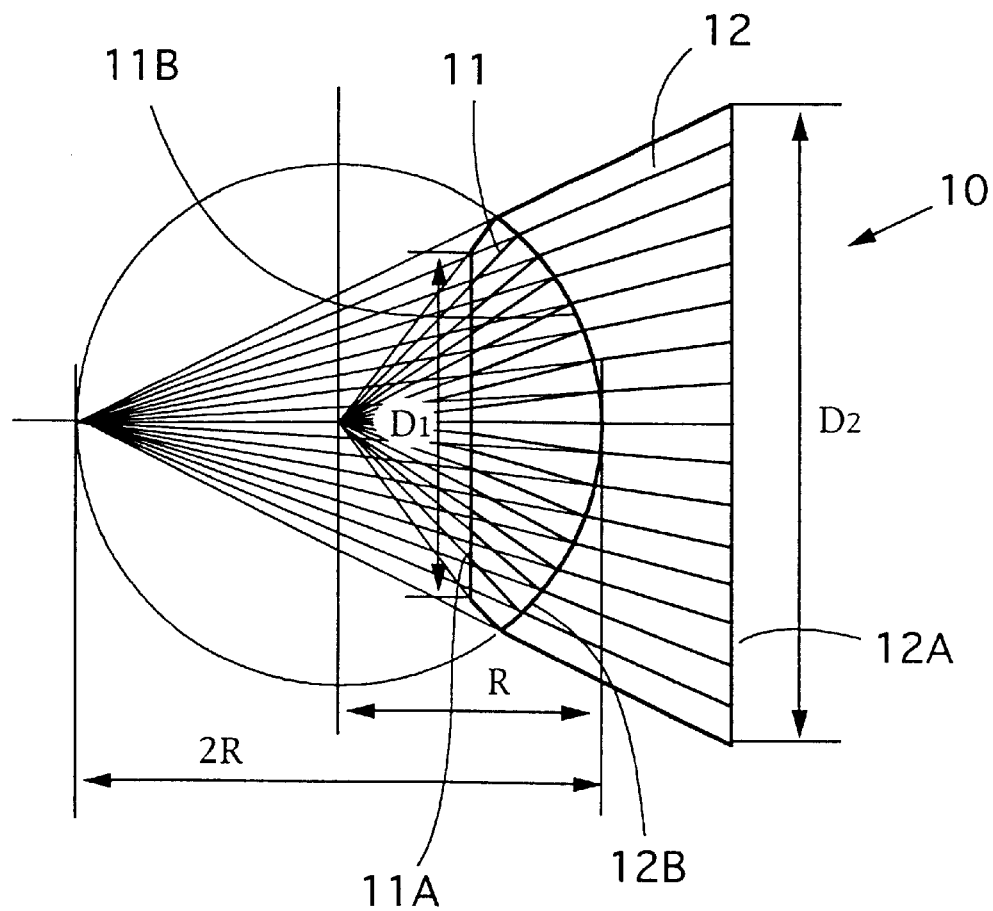
FIG. 2 is a sectional view showing the configuration of an image deforming device in FIG. 1.

FIG. 1 is a sectional view showing the configuration of an optical system according to the first embodiment of the projection method of the present invention, and FIG. 2 is a sectional view showing the configuration of an image deforming device used in FIG. 1 (in the sectional view of the configuration, for descriptive convenience, convergence of optical fibers which are radially diffused is also illustrated).

Reference numeral 1 in FIG. 1 denotes an original. An image deforming device 10 is arranged in front of the original 1. The image of the original 1 is transmitted from an end face 11A on the incident side of the image deforming device to an end face 12A on the emission side to be displayed on the end face 12A on the emission side as a deformed secondary image, and the deformed image is projected on a dome surface (not shown) by a projection lens 2.

In this embodiment, the image deforming device 10 has a structure in which one pair of tapered optical fiber bundles 11 and 12 are coupled to each other. One end serving as an end face 11A on the incident side of the optical fiber bundle 11 is ground to be flat, and the other end serving as an end face 11B on the coupling side is ground to be a convex spherical surface. One end serving as the end face 12A on the incident side of the optical fiber bundle 12 is ground to be flat, and the other end serving as an end face 12B on the coupling side is ground to be a concave spherical surface which coincides with the end face 11B on the coupling side of the optical fiber bundle 11. In FIG. 2, when the tapered optical fiber bundles 11 and 12 whose distances to an imaginary convergent point are R and 2R are supposed, the end face 11B on the coupling side of the optical fiber bundle 11 whose distance is R is set to be a convex surface having a radius of curvature R, and the end face 12B on the coupling side of the optical fiber bundle 12 whose distance is 2R is set to be a concave surface having the radius of curvature R. In this case, an image D1 transmitted from the end face 11A on the incident side of the optical fiber bundle 11 whose distance is R is eccentrically corrected to the end face 12A on the emission side of the optical fiber bundle 12 whose distance is 2R, and then displayed as an image D2 which is twice the image D1.

Therefore, in this embodiment, when an image displayed by deforming the image of an original as a secondary image on the end face 12A on the emission side of the image deforming device 10 is projected from a position on the circumference of a dome onto the projection surface of the spherical dome, distortion of the projected image is removed, and the same projected image as that obtained when the image of the original is projected from the center of the dome can be reproduced.

In this embodiment, a solid-state display device such as an LCD is supposed as the original 1. The device is designed such that a video image surface is arranged to be in tight contact with or to be close to the end face 11A on the incident side of the image deforming device 10. However, when the video image surface is close to the end face 11A, a means (for example, a means for filling of a transparent material or the like) for transmitting an image into optical fiber bundles constituting an image deforming device in which beams are not diffused depending on the degree of closing to the end face 11A is required. In addition, the optical fiber bundles 11 and 12 are coupled to each other to be in tight contact with each other or to be close to each other. In this case, the above condition is satisfied.

Second Embodiment

Figure 5:
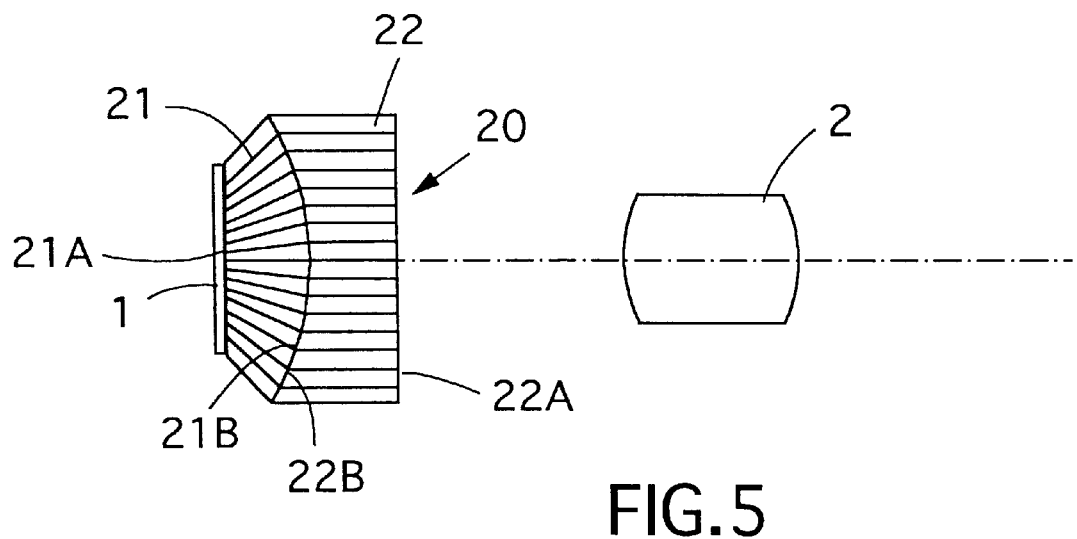
FIG. 5 is a sectional view showing the configuration of an optical system according to the second embodiment of the present invention.
Figure 6:
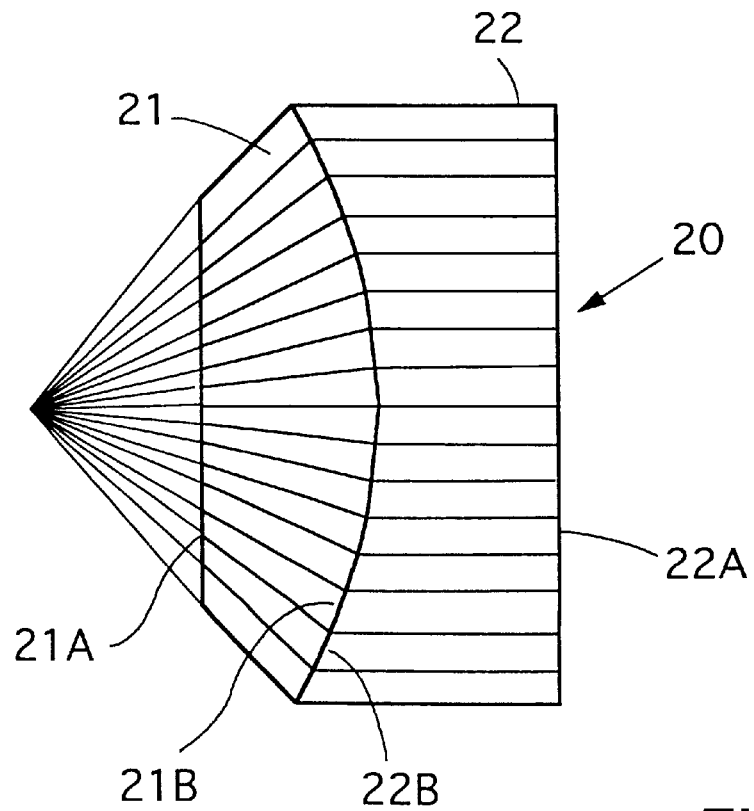
FIG. 6 is a sectional view showing the configuration of an image deforming device in FIG. 5.

FIG. 5 is a sectional view showing the configuration of an optical system according to the second embodiment of the projection method of the present invention, and FIG. 6 is a sectional view showing an image deforming device used in FIG. 5 (in the sectional view showing the configuration, for descriptive convenience, convergence of optical fibers which are radially diffused is also illustrated). In this embodiment, an image deforming device 20 has a configuration in which a tapered optical fiber bundle 21 on the incident side is coupled to a straight optical fiber bundle 22 on the emission side. One end serving as the end face 21A on the incident side of the tapered optical fiber bundle 21 is ground to be flat, and the other end serving as an end face 21B on the coupling side is ground to be a convex spherical surface (to be described later). One end serving as the end face 22A on the incident side of the straight optical fiber bundle 22 is ground to be flat, and the other end serving as an end face 22B on the coupling side is ground to be a concave spherical surface which coincides with the end face 21B on the coupling side of the optical fiber bundle 21.

Although the operation of the configuration described in the first embodiment described above can be easily understood, the following problems are posed when the configuration is actually manufactured.

(1) The degrees of tapering of optical fiber bundles must be made exactly equal to a design value.
(2) In order to obtain a wide angle of view, the degree of tapering becomes high.
(3) A beam must be incident while NA of an incident surface is sufficiently considered.
(4) As an angle of view is increased, limb darkening increases.
(5) Processing performed when an axis is offset is complex.

Of the conditions, the condition that the degree of tapering is made equal to a design value may be considerably difficult in consideration of the steps of manufacturing a tapered optical fiber at present. For this reason, in the second embodiment, it is considered that only one tapered optical fiber bundle is used. Here, the tapered optical fiber bundle is used on the incident side. In this case, when the curved surface of the end face on the coupling side of each optical fiber bundle is made spherical, an image converted into an orthogonal projection is displayed on the emission surface. However, when the curved surface is made into a paraboloid ($y=x^2/4R$), the same corrected image as that the image obtained in the first embodiment can be obtained. Calculation of the shape of paraboloid will be described below in detail.

Figure 7:
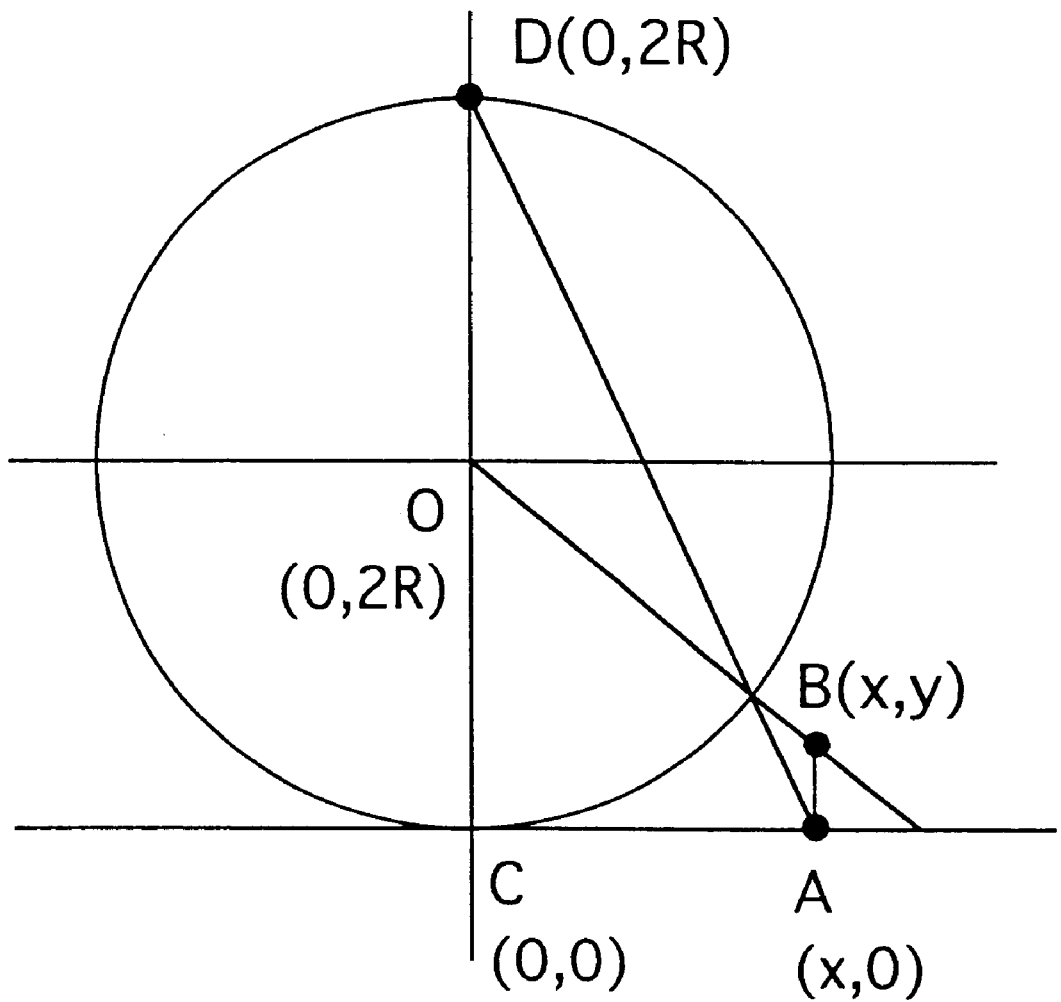
FIG. 7 is a chart showing a principle for calculating the shape of the image deforming device in FIG. 6.

In an imaginary dome shown in FIG. 7, an angle q/2 of an optical axis extending from a projection center C and another point D passing through a spherical center O on the dome to a position A of an arbitrary projected image to be calculated is given by the following equation, a dome diameter R, and an image height x on an imaginary plane vertical to the optical axis.

[Numerical Formula 1]

$$\tan\frac{\theta}{2} = \frac{\overline{CA}}{\overline{DC}} = \frac{x}{2R} \quad (1)$$

At this time, an angle q from the dome center is expressed by:

$$\tan\theta = \frac{2\tan\frac{\theta}{2}}{1-\tan^2\frac{\theta}{2}} = \frac{2\frac{x}{2R}}{1-\left(\frac{x}{2R}\right)^2} = \frac{\frac{x}{R}}{1-\frac{x^2}{4R^2}} = \frac{x}{R\left(1-\frac{x^2}{4R^2}\right)} \quad (2)$$

$$= \frac{x}{R - \frac{Rx^2}{4R^2}} = \frac{x}{R - \frac{x^2}{4R}} = \frac{x}{\frac{4R^2 - x^2}{4R}} = \frac{4Rx}{4R^2 - x^2}$$

Since the equation of a beam emitting from the dome center onto the dome is given by:

$$y = -\frac{1}{\tan\theta}x + R, \quad (3)$$

when Equation (3) is solved by substituting Equation (2) into Equation (3), an equation expressing the relationship between points B and x, i.e., the equation of the shape of a curve to be calculated is obtained.

$$y = -\frac{4R^2 - x^2}{4Rx}x + R = -\frac{4R^2x - x^2}{4Rx} + R = -\frac{4R^2x}{4Rx} - \frac{x^2}{4Rx} + R$$

$$= -R - \frac{x^2}{4R} + R = \frac{x^2}{4R}$$

Therefore, it is understood that the curve to be calculated is expressed by the following equation:

$$y = \frac{x^2}{4R} \quad (4)$$

Since the description of the remainder of this embodiment is the same as that of the first embodiment, the description will be omitted.

Third Embodiment

Figure 8:
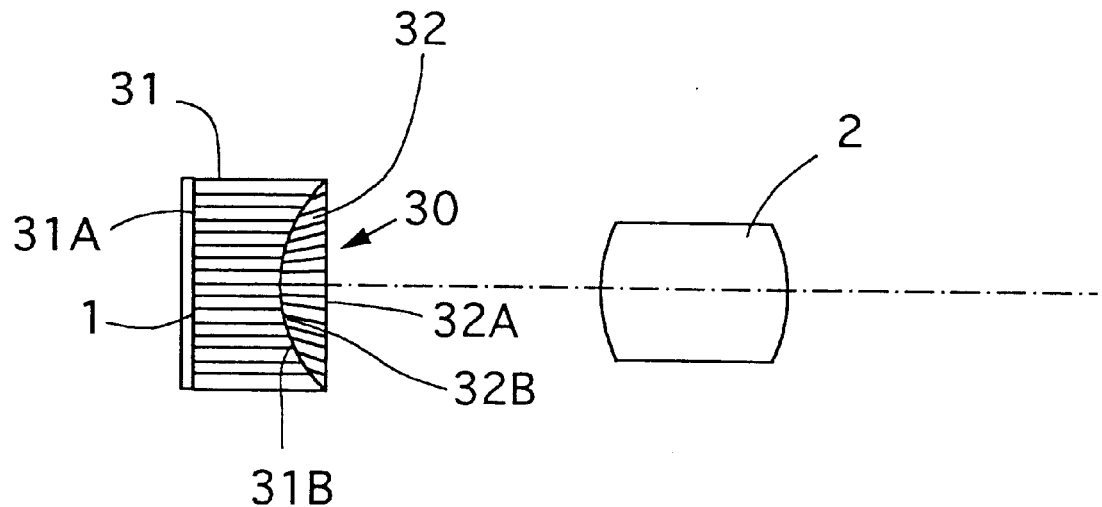
FIG. 8 is a sectional view showing the configuration of an optical system according to the third embodiment of the present invention.
Figure 9:
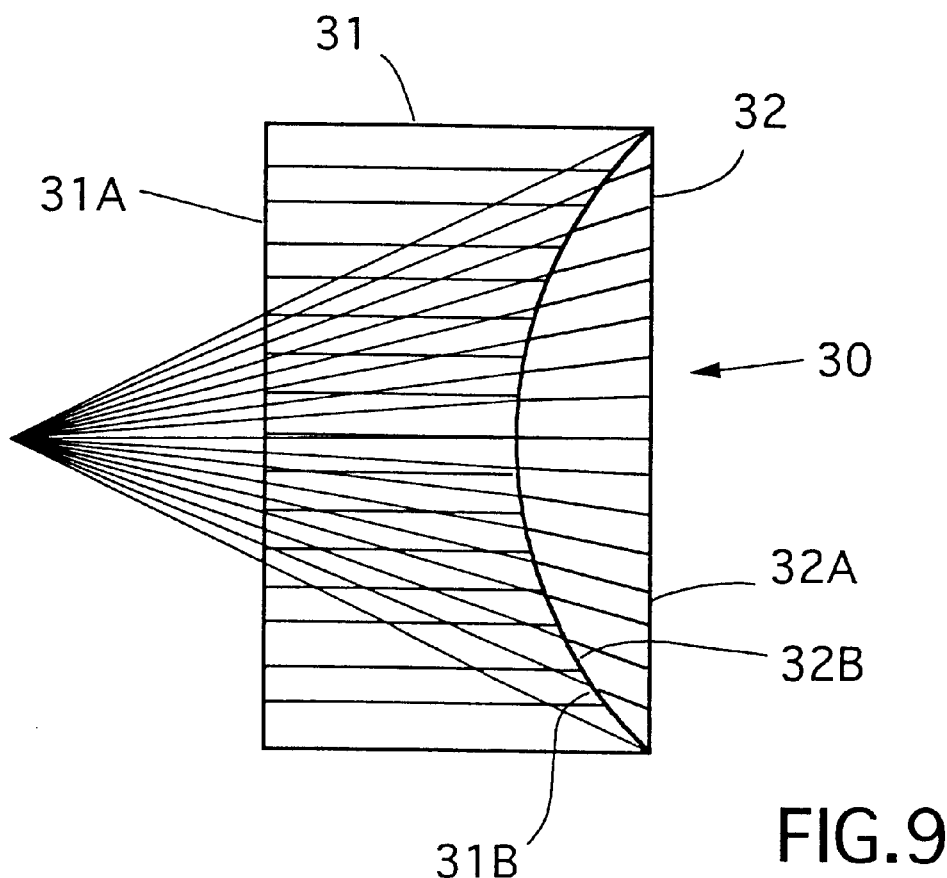
FIG. 9 is a sectional view showing the configuration of an image deforming device in FIG. 8.

FIG. 8 is a sectional view showing an optical system according to the third embodiment of the projection method of the present invention, and FIG. 9 is a sectional view showing an image deforming device used in FIG. 8 (in the sectional view showing the configuration, for descriptive convenience, convergence of optical fibers which are radially diffused is also illustrated). In this embodiment, an image deforming device 30 has a configuration in which a straight optical fiber bundle 31 on the incident side is coupled to a tapered optical fiber bundle 32 on the emission side. One end serving as an end face 31A on the incident side of the straight optical fiber bundle 31 is ground to be flat, and the other end serving as an end face 31B on the coupling side is ground to be a concave spherical surface (to be described later). One end serving as an end face 32A on the emission side of the tapered optical fiber bundle 32 is ground to be flat, and the other end serving as an end face 32B on the coupling side is ground to be a convex spherical surface which coincides with the end face 31B on the coupling side of the optical fiber bundle 31.

The materials in the configuration described in the second embodiment can be obtained easier than those of the combination of the tapered optical fiber bundles of the first embodiment. However, as in the combination of the tapered optical fiber bundles, the following problems are posed.

(1) In order to obtain a wide angle of view, the degree of tapering becomes high.
(2) A beam must be incident while NA of an incident angle is sufficiently considered.
(3) As an angle of view is increased, limb darkening increases.
(4) Processing performed when an axis is offset is complex.

For this reason, in the third embodiment, it is considered that tapered optical fiber bundles are used on the emission side. As in this embodiment, eccentric correction can be similarly performed by properly selecting the shape of the end face on the coupling side. In this embodiment, even if an axis is offset as in an actual arrangement of a projector, the incident surface of the straight optical fiber bundle is inclined to cope with the offset, and the shape of the end face on the coupling side and the processing method need not be largely changed. Since the degree of tapering may be equal to an angle of projection view obtained when the installation position of the projector, the angle of view can be widened. In addition, it is advantageous that an image on the incident surface is equal to an image on the emission surface in size. Calculation of the shape of the convex curved surface (the concave curved surface of the end face 31B on the coupling side of the straight optical fiber bundle 31 on the incident side) of the end face 32B on the coupling side of the tapered optical fiber bundle 32 on the emission side in this embodiment will be described below in detail.

Figure 10:
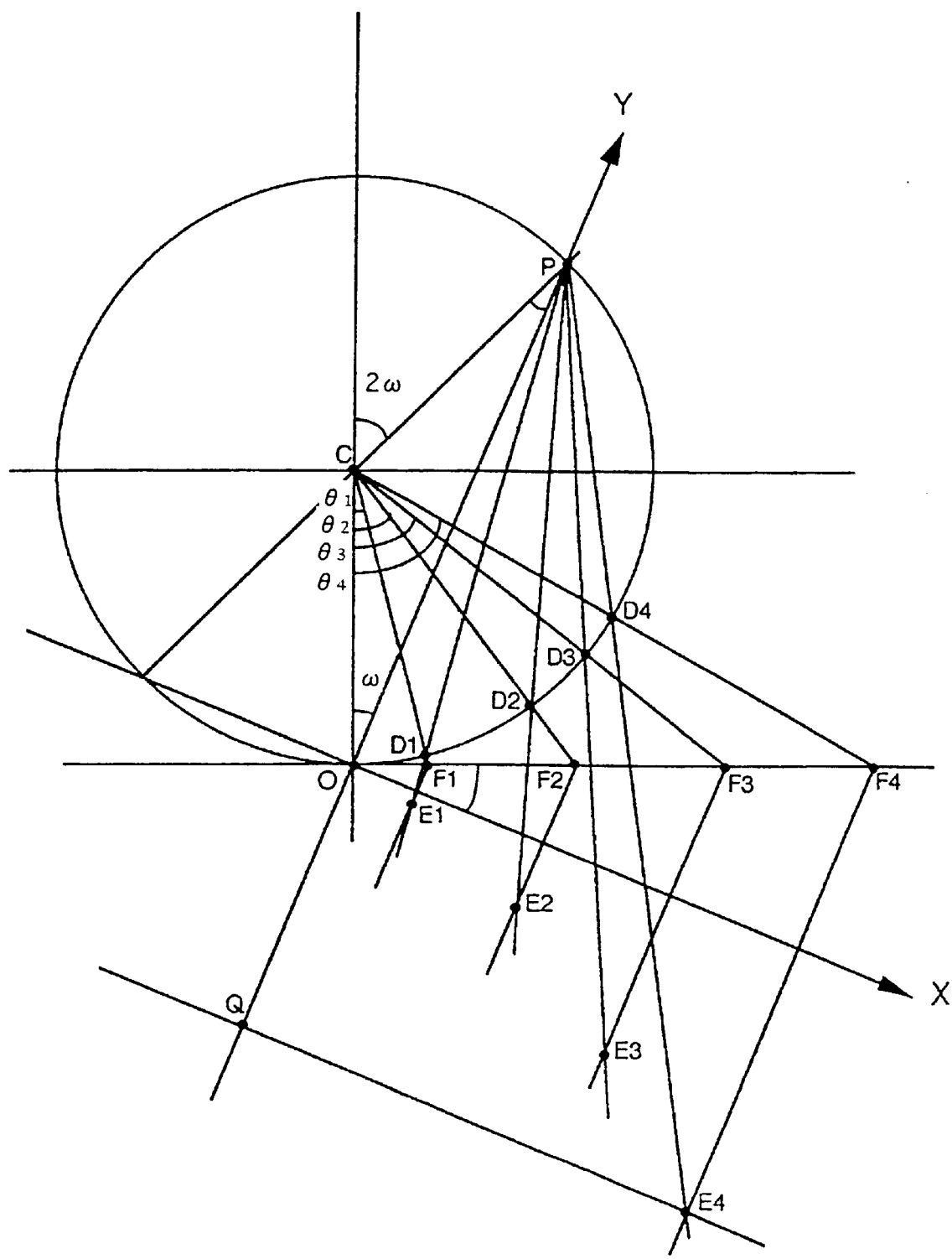
FIG. 10 is a chart showing a principle for calculating the shape of the image deforming device in FIG. 9.

In FIG. 10, when a projector is installed at a spherical center, straight lines $CF_1, \ldots, CF_n$ radially extending from the spherical center C cross the spherical surface at points $D_1, \ldots, D_n$. A straight line CO represents the optical axis of the projector, and a plane (represented by a body of rotation of $OF_1, \ldots, OF_n$ with respect to the optical axis CO) perpendicular to the optical axis represents an original. If a straight line CP is defined as a dome horizontal line (the left side of the straight line CP is under the horizontal line), and the projector placed at the spherical center C has an angle of elevation 2w. If the projector is installed at a point P, a straight line PO represents the optical axis of the projector, and a straight line $PE_1, \ldots, PE_n$ radially extending from the point P represent beams emitted from the projector. Here, such that an image obtained by the projector installed at the point P and an image obtained by the projector installed at the spherical center C are equal to each other on the spherical surface, i.e., when there are beams $PE_1 \ldots, PE_n$ emitted from the projector and crossing beams $CF_1 \ldots, CF_n$ from the spherical center C at the points $D_1 \ldots, D_n$, the equation of a curve represented by points $E_1 \ldots, E_n$ where straight lines $F_1 \ldots, F_n E_1 \ldots, E_n$ extending from points $F_1 \ldots, F_n$ on the original plate corresponding to the beams $CF_1 \ldots, CF_n$ parallel to the Y axis cross the beams $PE_1 \ldots, PE_n$ emitted from the projector is calculated. In this case, the image of the original subjected to eccentric correction can be obtained.

[Numerical Formula 2]

An angle q from a point $F_n$ and a spherical center is expressed by the following equation:

$$\tan\theta = \frac{x}{R\cos\omega} \tag{1}$$

When w=0, a point D on the spherical surface is given by the following equations:

$$y_D = R - R\cos\theta \tag{2}$$

$$x_D = R\sin\theta \tag{3}$$

For this reason, when $w \ne 0$, in consideration of rotation by w, the following equations are satisfied.

$$\begin{aligned} x_D &= R\sin\theta\cos\omega + (R - R\cos\theta)\sin\omega \\ &= R(\sin\theta\cos\omega + \sin\omega - \cos\theta\sin\omega) \end{aligned} \tag{4}$$

$$\begin{aligned} y_D &= -R\sin\theta\sin\omega + (R - R\cos\theta)\cos\omega \\ &= R(\cos\omega - \sin\theta\sin\omega - \cos\theta\cos\omega) \end{aligned} \tag{5}$$

The equation of a straight line PE radially extending from the point P is given by Equation (7), $$y = -\frac{y_P - y_D}{x_D}x + y_P \tag{7}$$

because the point P is expressed by Equation (6)

$$y_P = 2R\cos\omega \tag{6}$$

[Numerical Formula 3]

According to equations (4), (5), and (6), the following equation is satisfied:

$$\begin{aligned} y &= -\frac{2R\cos\omega - \{R(\cos\omega - \sin\theta\sin\omega - \cos\theta\cos\omega)\}}{R(\sin\theta\cos\theta + \sin\omega - \cos\theta\sin\omega)}x + 2R\cos\omega \\ &= -\frac{2\cos\omega - (\cos\omega - \sin\theta\sin\omega - \cos\theta\cos\omega)}{\sin\theta\cos\omega + \sin\omega - \cos\theta\sin\omega}x + 2R\cos\omega \\ &= -\frac{2\cos\omega - \cos\omega + \sin\theta\sin\omega + \cos\theta\cos\omega}{\sin\theta\cos\omega + \sin\omega - \cos\theta\sin\omega}x + 2R\cos\omega \\ &= -\frac{\cos\omega + \sin\theta\sin\omega + \cos\theta\cos\omega}{\sin\theta\cos\omega + \sin\omega - \cos\theta\sin\omega}x + 2R\cos\omega \\ &= -\frac{\cos\omega + \cos(\theta - \omega)}{\sin\omega + \sin(\theta - \omega)}x + 2R\cos\omega \\ &= -\frac{2\cos\left(\frac{\theta-\omega+\omega}{2}\right)\cos\left(\frac{\theta-\omega-\omega}{2}\right)}{2\sin\left(\frac{\theta-\omega+\omega}{2}\right)\cos\left(\frac{\theta-\omega-\omega}{2}\right)}x + 2R\cos\omega \\ &= -\frac{\cos\frac{\theta}{2}}{\sin\frac{\theta}{2}}x + 2R\cos\omega \\ &= -\frac{1}{\tan\frac{\theta}{2}}x + 2R\cos\omega \end{aligned} \tag{8}$$

$$y = -\frac{1}{\tan\frac{\theta}{2}}x + 2R\cos\omega$$

[Numerical Formula 4]

When equation (8) is solved with respect to tan q/2, the following equation is satisfied:

$$-\frac{1}{\tan\frac{\theta}{2}}x = y - 2R\cos\omega \tag{9}$$

$$\tan\frac{\theta}{2} = -\frac{x}{y - 2R\cos\omega}$$

where, tan q/2 is given by the following equation:

$$\tan\theta = \frac{2\tan\frac{\theta}{2}}{1 - \tan^2\theta} \tag{10}$$

For this reason, by using Equations (1) and (9), the following equation:

$$\tan\theta = -\frac{2\tan\frac{\theta}{2}}{1-\tan^2\frac{\theta}{2}} = \frac{x}{R\cos\omega} \quad (11)$$

$$= -\frac{2\left(-\frac{x}{y-2R\cos\omega}\right)}{1-\left(-\frac{x}{y-2R\cos\omega}\right)^2} = \frac{x}{R\cos\omega}$$

[Numerical Formula 5]

In addition, when Equation (11) is solved with respect to y, the following equation is satisfied:

$$\frac{-2x}{(y-2R\cos\omega)\left\{1-\left(\frac{-x}{y-2R\cos\omega}\right)\left(\frac{-x}{y-2R\cos\omega}\right)\right\}} = \frac{x}{R\cos\omega} \quad (12)$$

$$\frac{-2x}{(y-2R\cos\omega)-(-x)\left(\frac{-x}{y-2R\cos\omega}\right)} = \frac{x}{R\cos\omega}$$

$$\frac{-2x}{(y-2R\cos\omega)-\left(\frac{x^2}{y-2R\cos\omega}\right)} = \frac{x}{R\cos\omega}$$

$$\frac{-2x}{x} = \frac{(y-2R\cos\omega)-\left(\frac{x^2}{y-2R\cos\omega}\right)}{R\cos\omega}$$

$$-2R\cos\omega = (y-2R\cos\omega) - \frac{x^2}{y-2R\cos\omega}$$

$$= \frac{y^2 - 4Ry\cos\omega + 4R^2\cos^2\omega - x^2}{y-2R\cos\omega}$$

$$-2R\cos\omega(y-2R\cos\omega) = y^2 - 4Ry\cos\omega + 4R^2\cos^2\omega - x^2$$

$$-2Ry\cos\omega + 4R^2\cos^2\omega = y^2 - 4Ry\cos\omega + 4R^2\cos^2\omega - x^2$$

$$y^2 - 4Ry\cos\omega + 2Ry\cos\omega + 4R^2\cos^2\omega - 4R^2\cos^2\omega - x^2 = 0$$

$$y^2 - 2Ry\cos\omega - x^2 = 0$$

$$y = \frac{2R\cos\omega \pm \sqrt{4R^2\cos^2\omega + 4x^2}}{2}$$

$$y = R\cos\omega \pm \sqrt{R^2\cos^2\omega + 4x^2}$$

[Numerical Formula 61]

An equation expressing the model shown in FIG. 10 is the following equation:

$$y = R\cos\omega\sqrt{R^2\cos^2\omega + x^2} \quad (13)$$

A curve given by Equation (13) is a curve to be calculated.

When an optical fiber bundle is actually processed, there are unknown parameters. In Equation (13), the radius R of the spherical surface is determined by the degree of tapering of the optical fiber bundle 32. The radius R must be calculated by the maximum diameter $D_{MAX}$, the minimum diameter $D_{MIN}$, and the length L of the optical fiber bundle 32.

[Numerical Formula 7]

A line /OP has been calculated from Equation (6) as the following equation:

$$\overline{OP} = 2R\cos\omega$$

A line /PQ is given by the following equation:

$$\overline{PQ} = \frac{D_{\max}}{D_{\max} - D_{\min}} L$$

When $x=D_{max}/2$ is substituted in Equation (13) (in addition, −1 is multiplied for correction of an original position), a line /OQ is given by the following equation:

$$\overline{OQ} = -\left\{R\cos\omega\sqrt{R^2\cos^2\omega + \left(\frac{D_{\max}}{2}\right)^2}\right\}$$

[Numerical Formula 8]

Here, since /OP=/PQ−/OQ is satisfied, the following equation is satisfied:

$$2R\cos\omega = \frac{D_{\max}}{D_{\max}-D_{\min}}L + \left\{R\cos\omega\sqrt{R^2\cos^2\omega + \left(\frac{D_{\max}}{2}\right)^2}\right\} \quad (14)$$

$$R\cos\omega = \frac{D_{\max}}{D_{\max}-D_{\min}}L\sqrt{R^2\cos^2\omega + \left(\frac{D_{\max}}{2}\right)^2}$$

$$R^2\cos^2\omega + \left(\frac{D_{\max}}{2}\right)^2 = \left(\frac{D_{\max}}{D_{\max}-D_{\min}}L - R\cos\omega\right)^2$$

$$= \left(\frac{D_{\max}}{D_{\max}-D_{\min}}L\right)^2 -$$

$$2R\cos\omega\left(\frac{D_{\max}}{D_{\max}-D_{\min}}L\right) + R^2\cos^2\omega$$

$$\left(\frac{D_{\max}}{2}\right)^2 = \left(\frac{D_{\max}}{D_{\max}-D_{\min}}L\right)^2 - 2R\cos\omega\left(\frac{D_{\max}}{D_{\max}-D_{\min}}L\right)$$

$$2R\cos\omega\left(\frac{D_{\max}}{D_{\max}-D_{\min}}L\right) = \left(\frac{D_{\max}}{D_{\max}-D_{\min}}L\right)^2 - \left(\frac{D_{\max}}{2}\right)^2$$

$$R = \frac{\frac{D_{\max}}{D_{\max}-D_{\min}}L}{2\cos\omega} - \frac{\left(\frac{D_{\max}}{2}\right)^2}{2\left(\frac{D_{\max}}{D_{\max}-D_{\min}}L\right)\cos\omega}$$

$$R = \frac{D_{\max}L}{2(D_{\max}-D_{\min})\cos\omega} - \frac{(D_{\max}-D_{\min})D_{\max}}{8L\cos\omega}$$

$$R = \frac{D_{\max}}{2\cos\omega}\left\{\frac{4L^2 - (D_{\max}-D_{\min})^2}{4L(D_{\max}-D_{\min})}\right\}$$

[Numerical Formula 9]

At this time, when $x=D_{max}/2$ is satisfied in Equation (1), the maximum angle of view $q_{max}$ from the spherical center can be calculated by the following equation:

$$\theta_{\max} = \tan^{-1}\left(\frac{D_{\max}}{2R\cos\omega}\right) \quad (15)$$

Since the description of the remainder of this embodiment is the same as that of the first embodiment, the description will be omitted.

Fourth Embodiment

Figure 11:
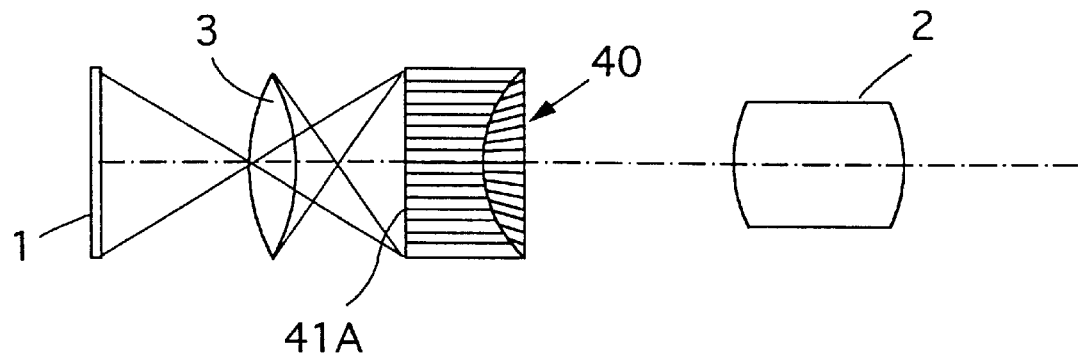
FIG. 11 is a sectional view showing the configuration of an optical system according to the fourth embodiment of the present invention.

FIG. 11 is a sectional view showing the configuration of an optical system according to the fourth embodiment of the projection method of the present invention. In this embodiment, a means for causing the image of an original to be incident on an image deforming device is different from that of each of the embodiment described above. Since the same image deforming device as that in the third embodiment is illustrated as an image deforming device 40 itself, a description thereof will be omitted.

In this embodiment, the image of an original 1 is formed on an end face 31A on the incident side of an image deforming device 31 by using a relay lens 3 to be incident on the image deforming device. A solid-state display device such as an LCD can be used as the original 1 as a matter of course, an optical original plate such as a CRT or a projection film can also be used (in this case, a light source is not omitted in FIG. 11). Since the description of the remainder of this embodiment is the same as that of the first embodiment, the description will be omitted.

Fifth Embodiment

Figure 12:
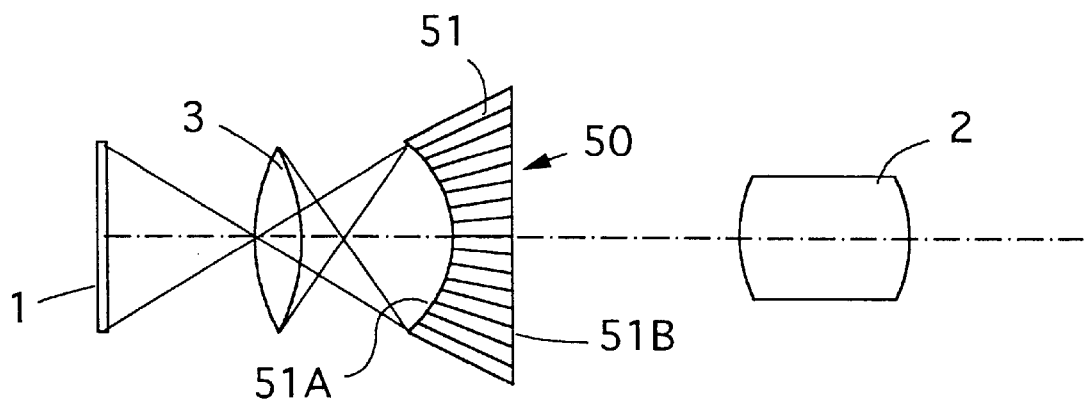
FIG. 12 is a sectional view showing the configuration of an optical system according to the fifth embodiment of the present invention.

FIG. 12 is a sectional view showing the configuration of an optical system according to the fifth embodiment of the projection method of the present invention. In this embodiment, a means for causing the image of an original to be incident on an image deforming device is different from that of each of the embodiment described above, and an image deforming device having a different configuration is used.

In this embodiment, an image deforming device 50 is constituted by a single tapered optical fiber bundle 51. One end serving as an end face 51A on the incident side of the optical fiber bundle is ground to be a concave spherical surface, and one end serving as an end face 52A on the emission side is ground to be flat.

In this embodiment, the image of an original 1 is formed on the end face 51A on the incident side of the image deforming device 50 by using a relay lens 3 to be incident on the image deforming device. This configuration is obtained such that the tapered optical fiber bundle on the incident side in the first embodiment is just replaced with an image deforming optical system constituted by a relay lens. Since the description of the remainder of this embodiment is the same as that of the first embodiment, the description will be omitted.

Sixth Embodiment

Figure 13:
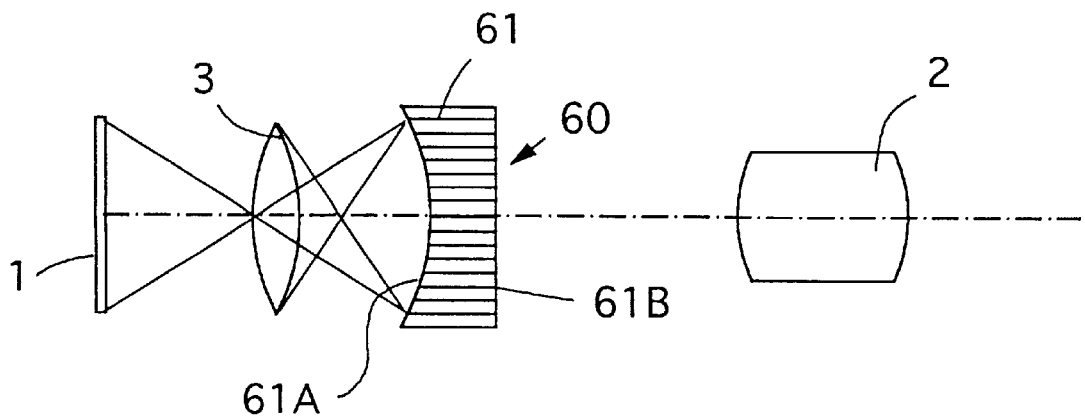
FIG. 13 is a sectional view showing the configuration of an optical system according to the sixth embodiment of the present invention.

FIG. 13 is a sectional view showing the configuration of an optical system according to the sixth embodiment of the projection method of the present invention. In this embodiment, the same means for causing the image of an original to be incident on an image deforming device as that of the fifth embodiment is employed, and an image deforming device having a different configuration is used.

In this embodiment, an image deforming device 60 is constituted by a single straight optical fiber bundle 61. One end serving as an end face 61A on the incident side of the optical fiber bundle is ground to be a predetermined concave curved surface, and one end serving as an end face 62A on the emission side is ground to be flat.

In this embodiment, the image of an original 1 is formed on the end face 61A on the incident side of the image deforming device 60 by using a relay lens 3 to be incident on the image deforming device. This configuration is obtained such that the tapered optical fiber bundle on the incident side in the second embodiment is just replaced with an image deforming optical system constituted by a relay lens. Since the description of the remainder of this embodiment is the same as that of the second embodiment, the description will be omitted.

The invention having the above configuration has the following unique advantages.

1. Even if a projector is installed at any place, a perfect video image which is free from distortion can be obtained by the same manner as that performed when the projector is installed at the center of a dome. For this reason, a video image whose angle of view must be narrowed to decrease distortion due to an installation position in the prior art can be projected with a wide angle of view, and the feeling of being at a live performance which the video image has can be sufficiently reproduced.

2. The projection method described above can be performed without regarding the type of an original, the projection method can be particularly usefully applied to a video projector using a solid-state display device such as an LCD which has been mainly used in recent years.

3. A dedicated device in which the pixel arrangement/pixel size of a solid-state display device such as an LCD itself are changed need not be manufactured, and a large-scale circuit for performing pixel rearrangement for deformation need not be added, and an image corrected by a purely optical means is obtained. For this reason, the projection method of item 1 can be realized at a low cost.

What is claimed is:

1. An image projection system for a dome surface comprising:
   a projector, arranged at a position other than the center of a dome, for projecting an image on a projection surface in the dome, and
   an image deforming device arranged in front of an original of the projector and consisting of an optical fiber bundle for transmitting an image of the original from an end face on an incident side to an end face on an emission side as images divided into pixels using optical fibers as units to display the images on the end face on the emission side as a secondary image which is deformed, wherein
   when the secondary image is projected on the projection surface in the dome, distortion of the projected image is removed such that the projected image coincides with a projected image obtained when an original is projected from the center of the dome onto the same projection surface.

2. An image projection system for a dome surface according to claim 1, wherein
   the image deforming means has:
      a tapered optical fiber bundle on the incident side on which the image of the original is incident; and
      a tapered optical fiber bundle on the emission side for displaying the image being incident by connecting the optical fiber bundle to the optical fiber bundle on the incident side on the end face on the emission side as a secondary image, and
      coupling end faces of the optical fiber bundle on the incident side and the optical fiber bundle on the emission side are made curved surfaces.

3. An image projection system for a dome surface according to claim 1, wherein
   the image deforming means has:
      a tapered optical fiber bundle on the incident side on which the image of the original is incident; and
      a straight optical fiber bundle on the emission side for displaying the image being incident by connecting the optical fiber bundle to the optical fiber bundle on the incident side on the end face on the emission side as a secondary image, and
      coupling end faces of the optical fiber bundle on the incident side and the optical fiber bundle on the emission side are made curved surfaces.

4. An image projection system for a dome surface according to claim 1, wherein
the image deforming means has:
a straight optical fiber bundle on the incident side on which the image of the original is incident; and
a tapered optical fiber bundle on the emission side for displaying the image being incident by connecting the optical fiber bundle to the optical fiber bundle on the incident side on the end face on the emission side as a secondary image, and
coupling end faces of the optical fiber bundle on the incident side and the optical fiber bundle on the emission side are made curved surfaces.

5. An image projection system for a dome surface according to any one of claims 1 to 4, wherein the original is arranged to be in tight contact with the end face on the incident side of the image deforming device.

6. An image projection system for a dome surface according to any one of claims 1 to 4, wherein the original is arranged to be close to the end face on the incident side of the image deforming device.

7. An image projection system for a dome surface according to any one of claims 1 to 4, wherein the image of the original is formed on the end face on the incident side of the image deforming device.

8. An image projection system for a dome surface according to claim 1, wherein
the image deforming device is constituted by a tapered optical fiber bundle in which the end face on the incident side on which the image of the original is formed is made into a curved surface.

9. An image projection system for a dome surface according to claim 1, wherein
the image deforming device is constituted by a straight optical fiber bundle in which the end face on the incident side on which the image of the original is formed is made into a curved surface.

* * * * *